W. STECHSCHULT.

Carriage Axle-Box.

No. 45,279.  Patented Nov. 29, 1864.

Witnesses.
Henry Aborns.
James P. Hall.

Inventor.
William Stechschult,
per Munn & Co.
attys.

UNITED STATES PATENT OFFICE.

WILLIAM STECHSCHULT, OF GLANDORF, (OTTAWA P O.,) OHIO.

IMPROVEMENT IN CARRIAGE AXLE-BOXES.

Specification forming part of Letters Patent No. 45,279, dated November 29, 1864.

*To all whom it may concern:*

Be it known that I, WILLIAM STECHSCHULT, of Glandorf, (Ottawa P. O.,) in the county of Putnam and State of Ohio, have invented a new and Improved Axle-Box; and I do hereby declare that the following is a full, clear, and exact description thereof, which will enable others skilled in the art to make and use the same, reference being had to the accompanying drawings, forming part of this specification, in which—

Figure 1:
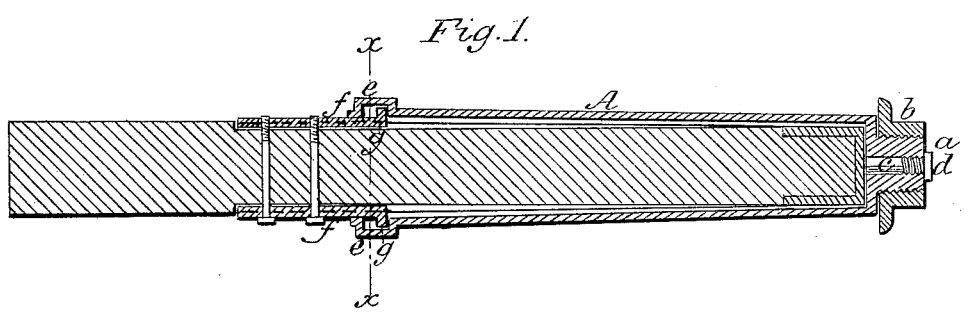
Figure 2:
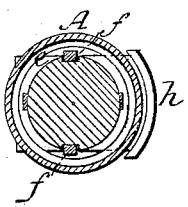

Figure 1 represents a longitudinal central section of this invention. Fig. 2 is a transverse section of the same, the line $x\ x$, Fig. 1, indicating the plane of section.

Similar letters of reference indicate like parts.

This invention is intended as an improvement on an axle-box for which Letters Patent have been granted to me March 15, 1864, and which consists in the arrangement of two projections or lugs rising from plates or brackets that are secured to the axle by bolts or other suitable means, one or both of said projections being provided with noses or scrapers, in combination with a circular groove in the rear end of the hub or bore and with an oil-hole in front in such a manner that the oil contained in the circular groove at the rear end of the hub or axle-box is pushed out and spread on the axle by the action of the scraper or scrapers, and at the same time by having two plates or linchpins—one on either side of the axle—the strain of the wheel on the axle is equalized and the friction reduced.

The object of this present invention is to combine the advantages of my previous improvement with an axle-box, which is cast solid with the cap which closes the same in front, and which is perforated with a small oil-hole, that is closed, when not used, by a screw-plug in such a manner that no part of the oil poured in the axle-box and scraped off and pushed back therein by the action of the spreading-noses is allowed to waste; and, furthermore, a solid, cheap, and durable axle-box is produced.

A represents the axle-box, which ought to be cast solid throughout, so that the oil has no chance to run out. Its front end is closed and provided with a nipple, $a$, with a screw-thread to fit into the nut $b$, which serves to retain the axle-box within the hub. The nipple $a$ is perforated with a small hole, $c$, which can be closed by a screw-plug, $d$, and through which the lubricating material is introduced to the axle. If this screw-plug is in its place, the axle-box is perfectly closed in front, and the oil has no chance to escape.

The surplus oil collects in the annular groove $e$, which is at or near the rear end of the axle-box, and cast solid with the same, and said axle-box is retained on the axle by two linchpins, $f\ f$, which are firmly secured to two opposite sides of the axle, as clearly shown in Fig. 1 of the drawings. The projections $g$ of these linchpins $f\ f$ are so shaped that they scrape the oil from the annular groove and throw it forward into the axle-box. These linchpins ought to be made of steel or other hard and durable material, so that they do not wear away by the constant friction to which they are exposed.

If my axle-box is used in combination with a wooden axle, the front end of the axle ought to be protected by an iron ring or cap, $g$, and if the axle should have too much end-play a leather washer may be interposed.

A lip, $h$, of cast-iron or sheet metal, is screwed fast to the axle to keep the oil clear.

It must be remarked that instead of using the nut $b$ to retain the axle-box in the hub, projections cast on the front end of said box, and wedges driven in between them, or any other suitable device, may be used.

I claim as new and desire to secure by Letters Patent—

An axle-box, A, cast solid throughout, inclosing the projections of the linchpins and the end of the spindle, and applied in combination with the screw-plug $d$, annular groove $e$, and linchpins $f\ f$, constructed and operating in the manner and for the purpose herein shown and described.

WILLIAM STECHSCHULT.

Witnesses:
HERMANN H. RECKER,
AUGUST STECHSCHULT.